US008421394B2

(12) United States Patent
Schmitt et al.

(10) Patent No.: US 8,421,394 B2
(45) Date of Patent: Apr. 16, 2013

(54) METHOD AND APPARATUS FOR CURRENT MEASUREMENT IN AN ELECTRICAL NETWORK, IN PARTICULAR A MULTIPHASE ELECTRICAL NETWORK

(75) Inventors: Gilles Schmitt, Strasbourg (FR); Sven Finke, Gerlingen (DE); Jochen Kurfiss, Lomersheim (DE)

(73) Assignee: Robert Bosch GmbH, Stuttgart (DE)

( * ) Notice: Subject to any disclaimer, the term of this patent is extended or adjusted under 35 U.S.C. 154(b) by 795 days.

(21) Appl. No.: 12/514,035

(22) PCT Filed: Sep. 20, 2007

(86) PCT No.: PCT/EP2007/059984
§ 371 (c)(1),
(2), (4) Date: Dec. 11, 2009

(87) PCT Pub. No.: WO2008/055741
PCT Pub. Date: May 15, 2008

(65) Prior Publication Data
US 2010/0072980 A1    Mar. 25, 2010

(30) Foreign Application Priority Data
Nov. 7, 2006  (DE) .......................... 10 2006 052 467

(51) Int. Cl.
*G05B 11/28*  (2006.01)
(52) U.S. Cl.
USPC .......................................... 318/599; 318/811
(58) Field of Classification Search .................. 318/599, 318/811, 139, 400.17, 400.2, 727, 799, 801
See application file for complete search history.

(56) References Cited

U.S. PATENT DOCUMENTS

| 5,955,862 | A | | 9/1999 | Nguyen Phuoc | |
|---|---|---|---|---|---|
| 5,969,498 | A | * | 10/1999 | Cooke | 318/799 |
| 6,049,474 | A | | 4/2000 | Platnic | |
| 6,069,467 | A | * | 5/2000 | Jansen | 318/802 |
| 6,462,974 | B1 | * | 10/2002 | Jadric | 363/127 |
| 6,984,953 | B2 | * | 1/2006 | Quirion et al. | 318/400.3 |

(Continued)

FOREIGN PATENT DOCUMENTS

| EP | 0798847 A1 | 10/1997 |
|---|---|---|
| EP | 0822648 A1 | 2/1998 |

(Continued)

*Primary Examiner* — Rina Duda
(74) *Attorney, Agent, or Firm* — Maginot, Moore & Beck

(57) ABSTRACT

The invention relates to a method for current measurement in an in particular multiphase electrical system, in which an electrical load is energized as desired by at least one circuit element and a control unit produces drive signals which act on the at least one circuit element in order to achieve the desired energization of the load. The invention provides that clock patterns of the drive signals are associated with measurement windows for current measurement, in particular for measuring phase currents, and clock patterns are temporally offset in order to obtain measurement windows with a sufficient temporal length. A minimum temporal shift is the sum of a minimum dead time of the circuit element, a minimum settling time of the measuring amplifier circuit, and a minimum sampling time of the analogue-to-digital converter. The invention furthermore provides that the clock patterns are selected taking into consideration a phase selection for the current measurement. Provision may be made for the clock patterns to be selected taking into consideration the instantaneous rotary angle position of the phase vector. In addition, a corresponding apparatus is specified.

7 Claims, 13 Drawing Sheets

| U.S. PATENT DOCUMENTS | | |
|---|---|---|
| 2002/0167300 A1 | 11/2002 | Kim |
| 2003/0173946 A1 | 9/2003 | Liu et al. |
| 2004/0095090 A1 | 5/2004 | Nukushina |
| 2004/0195995 A1 | 10/2004 | Quirion et al. |
| 2005/0226607 A1 | 10/2005 | Williams et al. |
| 2006/0006899 A1 | 1/2006 | de Larminat et al. |
| 2006/0103417 A1 | 5/2006 | Larminat et al. |
| 2006/0125513 A1 | 6/2006 | de Larminat et al. |
| 2007/0290640 A1 | 12/2007 | Williams et al. |

| FOREIGN PATENT DOCUMENTS | | |
|---|---|---|
| EP | 1347567 A1 | 9/2003 |
| EP | 1617555 A2 | 1/2006 |
| EP | 1768253 A2 | 3/2007 |
| WO | 03105329 A1 | 12/2003 |
| WO | 2005074115 A1 | 8/2005 |
| WO | 2006037966 A1 | 4/2006 |
| WO | 2006058808 A1 | 6/2006 |

* cited by examiner

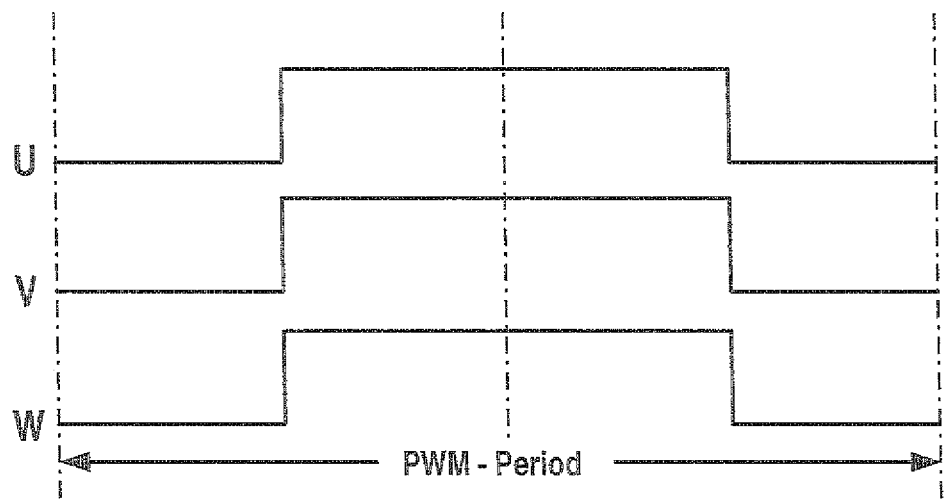
Fig. 2
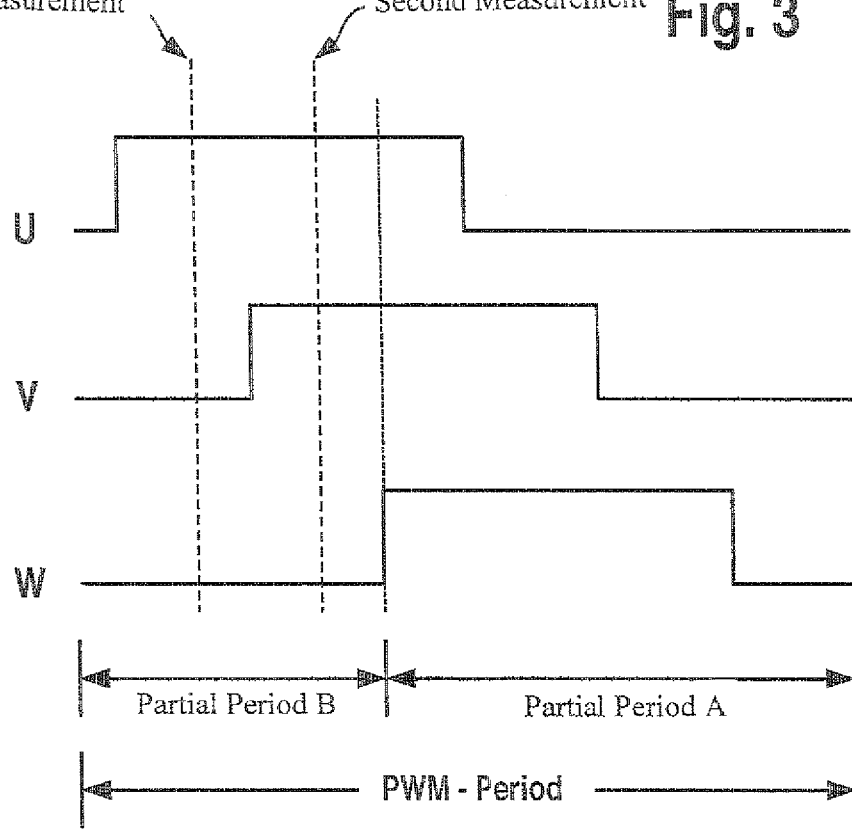
First Measurement    Second Measurement    Fig. 3

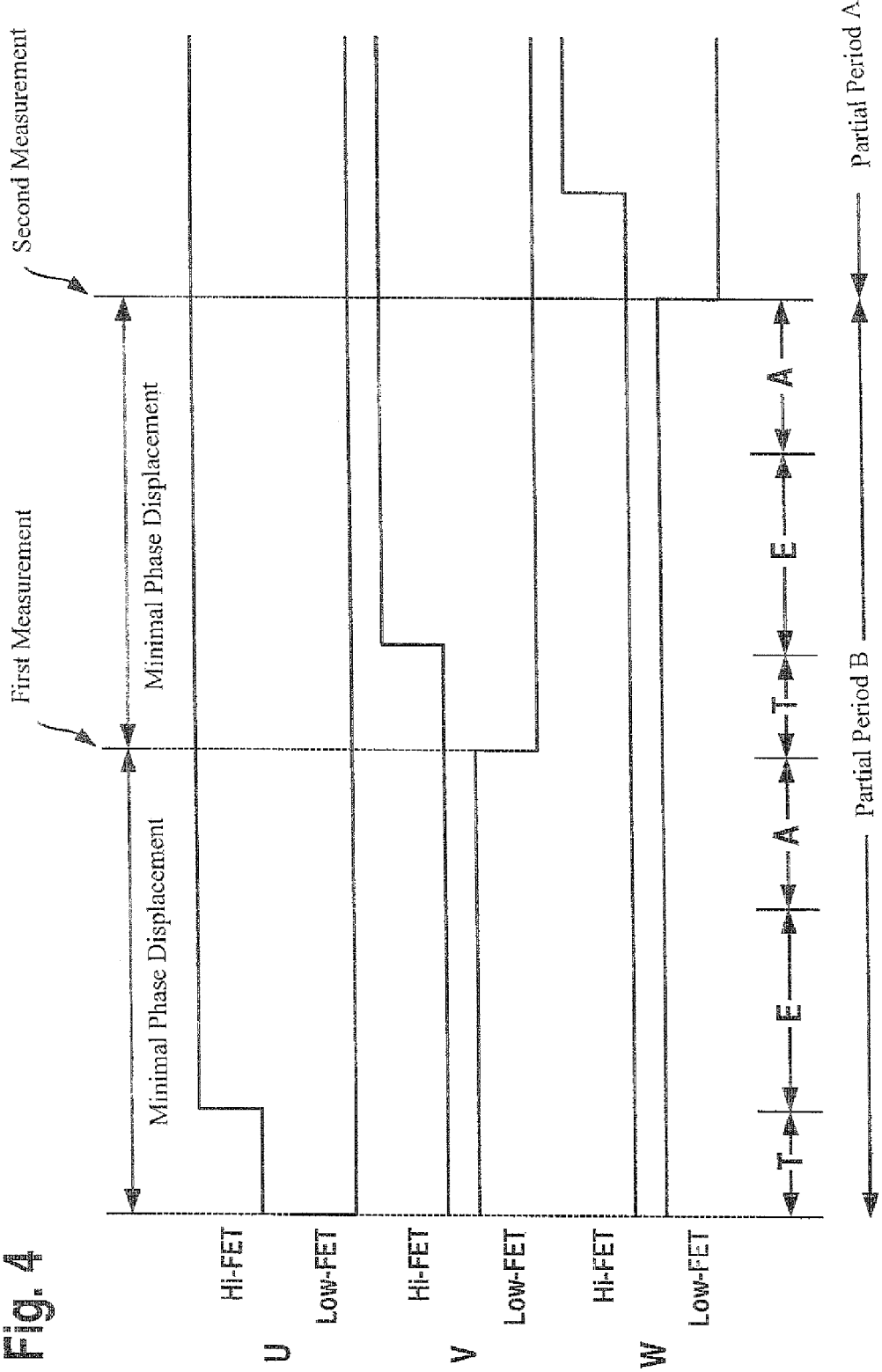

METHOD AND APPARATUS FOR CURRENT MEASUREMENT IN AN ELECTRICAL NETWORK, IN PARTICULAR A MULTIPHASE ELECTRICAL NETWORK

CROSS-REFERENCE TO RELATED APPLICATION

This application is a 35 USC 371 application of PCT/EP 2007/059984 filed on Sep. 20, 2007.

BACKGROUND OF THE INVENTION

Field of the Invention

The invention relates to a method for current measurement in a electrical network, in particular a multiphase electrical network.

Description of the Prior Art

In electric motors with multiphase triggering, there is often a demand for detecting the phase currents. If this involves energization of an electric motor by means of a controllable bridge that has controllable circuit elements in its individual bridge branches, then the electric motor can be energized in the desired way. To detect the phase currents, a low-impedance resistor (shunt) is disposed in each phase line. The effort and expense for this multiphase measurement array is correspondingly great.

OBJECT AND SUMMARY OF THE INVENTION

It is the object of the invention to make very simple, economical current measurement possible, and in particular little or no noise should occur from the measurement intervention and there should also be little or no torque waviness. Moreover, any components involved, such as link circuit capacitors, should be loaded only slightly.

In the subject of the invention, it is fundamentally provided that the current measurement is effected with only a single shunt, and the phase currents are ascertained in sequential order. It suffices, for instance in a three-phase array, to measure only two phases and to calculate the current of the third phase with the aid of Kirchhoff's laws. A bridge circuit provided with controllable circuit elements is used, for instance a B6 bridge, which has a DC link circuit, and the current flows through the common shunt in the supply line and return line from and to the link circuit and corresponds to the phase current to be measured. The triggering of the circuit elements is effected with timing patterns of trigger signals in a special inventive manner.

In the method of the invention or the apparatus of the invention for current measurement with a measuring amplifier circuit and an analog/digital converter in a electrical network, in particular a multiphase electrical network, it is provided that by means of at least one controllable circuit element, a desired energization of an electrical consumer is effected, and a control unit generates trigger signals acting on the at least one controllable circuit element in order to attain the desired energization of the consumer; measurement windows are associated with timing patterns of the trigger signals for current measurement, in particular for measuring phase currents, and timing patterns are chronologically shifted in order to obtain measurement windows of adequate chronological size, and wherein a minimal chronological shift is composed of the sum of a minimal dead time of the circuit element, in particular a minimal dead time of a bridge branch, a minimal settling time of the measuring amplifier circuit and a minimal sampling time of the analog/digital converter.

Accordingly, a minimal phase displacement can be ascertained/calculated, taking the hardware used into account. By minimizing this phase displacement, the wattless currents generated by the phase displacement are likewise minimized, and wattless currents contribute to heating of the bridge circuit. By minimizing the wattless currents, the heating of the bridge circuit is accordingly minimized as well. The aforementioned dead time of the circuit element is necessary to assure safe, secure, reliable switching. If the circuit element has been put in the conducting state by means of a trigger signal and then switched off again, then after the shutoff the dead time has to be waited out in order to guarantee a safe, secure, reliable zero crossover of the current. The settling time of the measuring amplifier circuit has to be waited out because of correspondingly steep edges of the measurement signal, in order to guarantee the most precise possible current measurement. The sampling time of the analog/digital converter must be waited out to enable the most error-free possible conversion. Preferably, the current measurement is performed at the end of the sampling time.

The invention further relates to a method or an apparatus for current measurement, in particular as described above, in a multiphase electrical network, in which by means of controllable circuit elements a desired energization of an electrical consumer is effected and a control unit generates trigger signals acting on the controllable circuit elements in order to attain the desired energization of the consumer; measurement windows are associated with timing patterns of the trigger signals for current measurement of phase currents and timing patterns are chronologically shifted, in order to obtain measurement windows of adequate chronological size, and wherein the timing patterns are selected taking into account a phase selection for the current measurement. Accordingly, a selection takes place of the phase relationship for a current measurement vector that occurs as a result of the current measurement. Because of the measurement intervention, a vector error can occur in the applicable triggering period. By the selection of the phase relationship, the vector error is minimized, if at all possible to zero. As a result, less noise occurs, and there is less torque waviness.

The invention further relates to a method or an apparatus for current measurement, in particular as described above, in a multiphase electrical network having a phase vector, in which by means of controllable circuit elements a desired energization of an electrical consumer is effected and a control unit generates trigger signals acting on the controllable circuit elements in order to attain the desired energization of the consumer; measurement windows are associated with timing patterns of the trigger signals for current measurement of phase currents and timing patterns are chronologically shifted, in order to obtain measurement windows of adequate chronological size, and wherein the timing patterns are selected taking into account the instantaneous rotary angle position of the phase vector. As a result, compensation for the current measurement vector is reduced, with the result that there is a reduction in the wattless current and the torque waviness.

The aforementioned calculation/ascertaining of the minimal phase displacement in an asymmetrical pulse width modulation takes into account the case in which the phase current in the PWM period in question has to be measured only once. For the minimal phase displacement, a different value results in the event that the applicable phase current is supposed to be measured two to n times in the pulse width modulation period (PWM period) in question. In such a case, the term (n−1)·minimal conversion time W of the analog/digital converter is additively added to the aforementioned sum. In this term, n stands for the number of measurements of a phase current per PWM period. This accordingly takes into account the conversion time of the analog/digital converter, the number of which depends on the number of measurements per PWM period.

In a refinement of the invention, it is provided that pulse width modulation signals are used as the trigger signals. The triggering of the controllable circuit elements is accordingly preferably done by means of pulse width modulation (PWM), and because of the procedure according to the invention, instead of a symmetrical PWM, an asymmetrical PWM is present.

It is advantageous if as the consumer, an asynchronous motor, in particular a multiphase asynchronous motor, or a permanent magnet synchronous motor, in particular a multiphase permanent magnet synchronous motor, is energized. The consumer, in particular the aforementioned motors, are preferably connected in a Y connection.

It is furthermore advantageous if the measurement of a phase current of the consumer is effected in one measurement window each. The measurement of the individual phase currents is accordingly done in chronological succession.

It is furthermore advantageous if as the circuit elements (4), electronic components are used, in particular transistors, preferably field effect transistors (FETs), and/or thyristors. These circuit elements have control inputs to which the trigger signals are applied, and as a result, the switching states of the circuit elements are altered.

In a refinement of the invention, it is provided that the energization of the consumer is effected with a controllable bridge circuit. The circuit elements are located in the individual branches of the bridge circuit; in particular, a B6 bridge is used, and the consumer is a three-phase consumer in a Y connection, in particular a corresponding asynchronous motor or a corresponding permanent magnet synchronous motor.

Preferably, the bridge circuit is supplied by a DC circuit, in particular a DC link circuit.

The current measurement is performed by means of only one shunt, which is located preferably in the DC circuit, in particular the DC link circuit. The triggering of the individual circuit elements for measuring the particular phase current should be selected such that the phase current flows through the shunt in the corresponding measurement window. The signal at the shunt is then amplified by means of the measuring amplifier and converted by means of the analog/digital converter and is available for various purposes.

In particular, it is provided that the phase selection is effected such that a deviation generated by the current measurement from a predetermined set-point vector becomes zero or is kept as small as possible. As a result, losses can be minimized.

It is advantageous if a current measurement vector effected by the current measurement is selected in terms of its phase relationship for minimizing the deviation. Various possibilities are available with respect to the phase relationship; preferably, the procedure is such that the phase relationship that leads to the least losses is selected.

It is moreover advantageous if a current measurement vector effected by the current measurement rotates with the phase vector. As a function of the instantaneous rotary angle position of the phase vector, the current measurement is accordingly performed, so that not only the phase vector but also the current measurement vector rotates.

The phase vector preferably comprises the combination of a torque-adjusting and field-forming vector.

The procedure according to the invention is used particularly in a power steering system in a motor vehicle, in which the consumer is a correspondingly triggered motor that actuates the steering system.

BRIEF DESCRIPTION OF THE DRAWINGS

The exemplary embodiments are described in detail below in conjunction with the drawings, in which:
FIG. 2 is a timing diagram of trigger signals;
FIG. 3 is a timing diagram of the trigger signals shown in FIG. 2 that have been time shifted;
FIG. 4 is a timing diagram of the partial period B of FIG. 3 shown in more detail.

DESCRIPTION OF THE PREFERRED EMBODIMENTS

Figure 1:
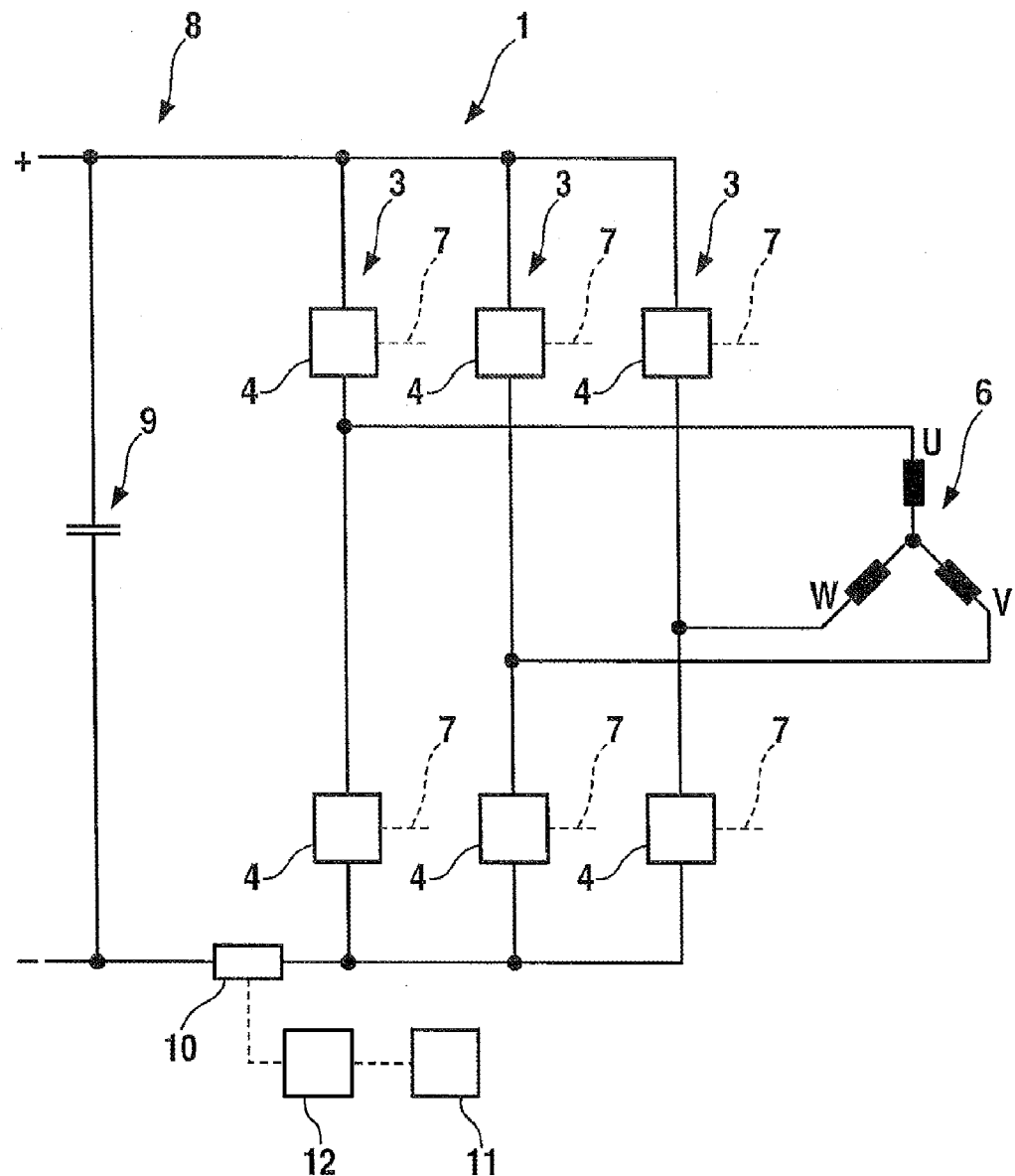
FIG. 1 is a circuit diagram.

FIG. 1 shows a bridge circuit 1, which is connected to a DC circuit. The bridge circuit 1 is embodied as a B6 bridge, with three bridge branches 3. Each bridge branch 3 has two controllable circuit elements 4. A consumer, which is embodied as a three-phase asynchronous motor 6, is triggered by the bridge circuit 1. A control unit, not shown, generates trigger signals in accordance with certain timing patterns, and the trigger signals are delivered to control inputs 7 of the circuit elements 4, as a result of which the circuit elements can be switched into the conducting or the blocking state. In the DC circuit, which is embodied as a DC link circuit 8, there is a link circuit capacitor 9. The DC link circuit 8 is connected to the bridge circuit 1 via a shunt 10.

In the procedure according to the invention, there is a single shunt 10, with which the phase currents of the asynchronous motor 6 can be ascertained in sequential order. Preferably, two phase currents of the total of three phase currents are measured, and the third phase current is calculated by means of Kirchhoff's laws. A certain switching pattern, that is, a certain triggering of the controllable circuit elements 4, is necessary so that the current through the common shunt 10 in the supply line and return line from and to the DC link circuit 8 corresponds to the phase current to be measured. A measuring amplifier circuit 12 and an analog/digital converter 11, which converts the analog signal of the shunt 10 into a digital signal, are connected to the shunt 10. The measuring amplifier circuit 12 has a settling time E (FIG. 4) in operation. The analog/digital converter 11 has a sampling time A (FIG. 4), and the circuit elements 4, preferably embodied as field effect transistors (FETs), have a dead time T (FIG. 4).

The triggering of the circuit elements 4 by means of the control unit, not shown, is not effected in accordance with FIG. 2, since in that drawing a known center-centered pulse width modulation is shown; that is, the trigger signals shown there form a center-centered timing pattern for the individual phases U, V and W, within the pulse width modulation period (PWM period) shown in FIG. 2. If this triggering were done, then the phase currents of the motor 6 could not be ascertained with the aid of a single shunt 10, because of the simultaneity. Accordingly, a shift is made to the procedure shown in FIG. 3, in which a different timing pattern is selected; that is, the switching times of the circuit elements 4 are chronologically shifted in accordance with FIG. 3, so that it is possible to measure at least two phase currents within one pulse width modulation period. The two measurements are identified by measurement 1 and measurement 2 (first measurement and second measurement). At the time of the first measurement, the current through the shunt 10 corresponds to the current in the phase U; at the time of the second measurement, the current through the shunt 10 corresponds to the inverse current in phase W (which corresponds to adding the phase currents U and V together). The measurements are performed in the partial period B of the pulse width modulation period. The partial period B is adjoined by the partial period A, and the sum of partial period B and partial period A yields the pulse width modulation period. A comparison of FIGS. 2 and 3 illustrates the shifting of the switching times of the circuit elements 4.

In FIG. 4, the partial period B is illustrated in detail. The states of the circuit elements 4 embodied as field effect transistors are marked "Hi-FET" and "Low-FET" for the various phases U, V, and W. In order to be able to perform the first measurement now, hardware demands have to be taken into account. These include the dead time T of the circuit elements 4, the settling time E of the measuring amplifier circuit 12, and the sampling time A of the analog/digital converter 11. If these three times are minimized, or in other words made as short as possible while the applicable function is still assured, then the result as in FIG. 4 in the sum of these three times is the minimal phase displacement possible (minimal phase displacement) for the first measurement. The first measurement can then be done at the end of the sampling time A. The same is correspondingly true for performing the second measurement, since once again, the minimal dead time, minimal settling time, and minimal sampling time must first be waited out, and the sum of these three times yields the minimal phase displacement for the second measurement.

Accordingly, the displacement required for a current measurement is calculated as follows: displacement=dead time of the bridge branch+settling time of the measuring amplifier circuit+sampling time of the analog/digital converter.

The partial period B is thus obtained for two measurements as follows: partial period B=2×displacement.

Hence the partial period A is as follows:

partial period $A$=PWM period−partial period $B$.

FIG. 5 again clearly shows that for a current measurement in at least two phases of the asynchronous motor 6, a timing pattern for triggering the circuit elements 4 is needed, of a kind such that the current through the common shunt 10, which is located for instance in the ground line, corresponds to the current through the phases to be measured. This can be achieved—as already shown above—by phase displacement in an asymmetrical pulse width modulation.

Figure 5:
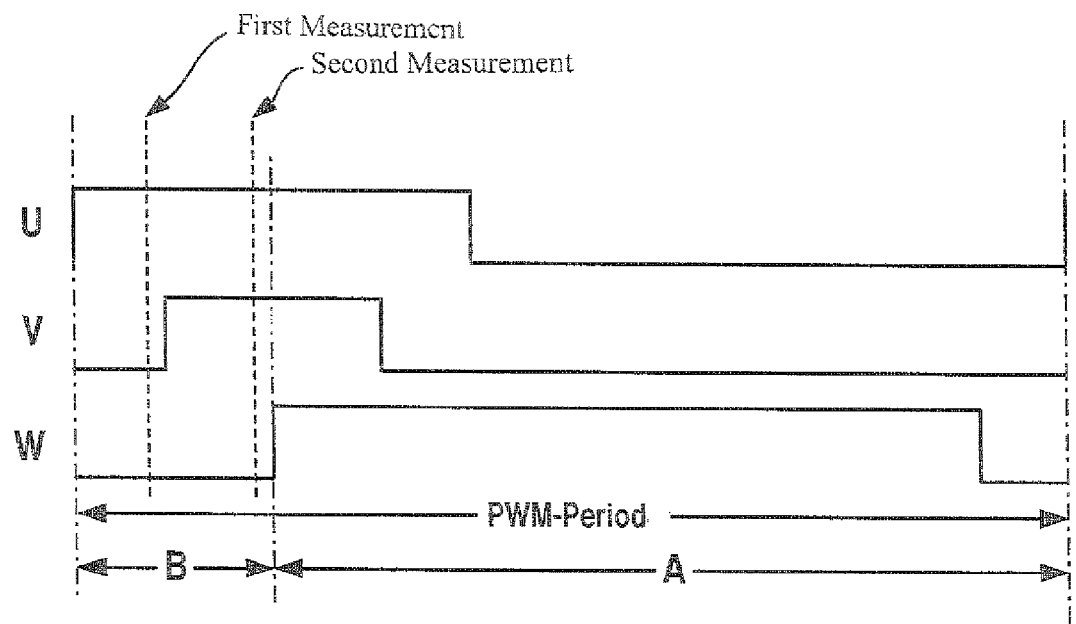
FIG. 5 is a timing diagram of asymmetrical trigger signals.
Figure 6:
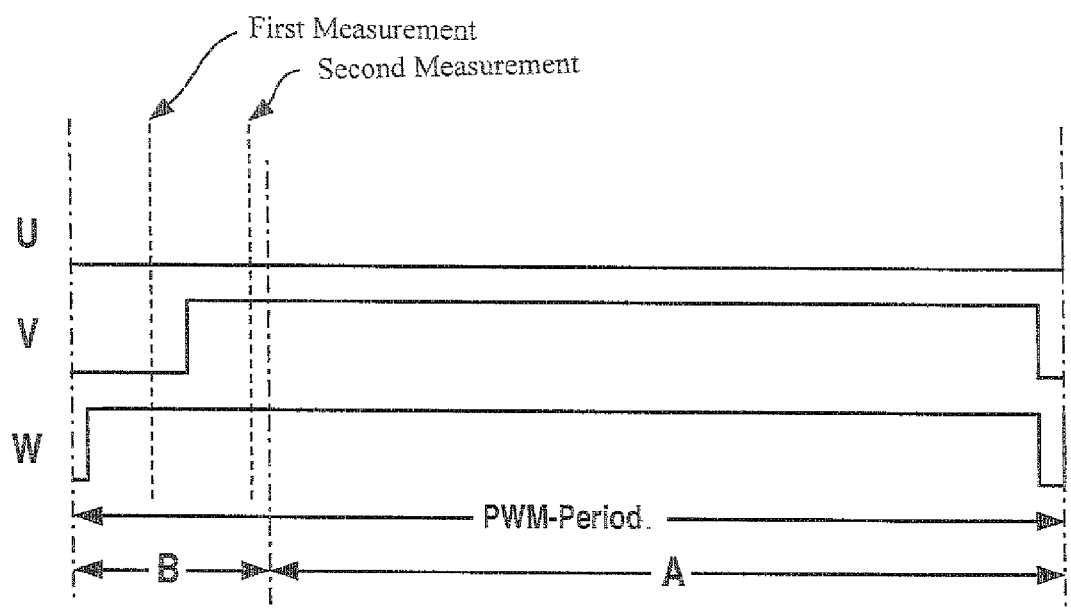
FIG. 6 is a timing diagram depicting an issue for current measurement that can occur in the trigger signals of FIG. 5.
Figure 7:
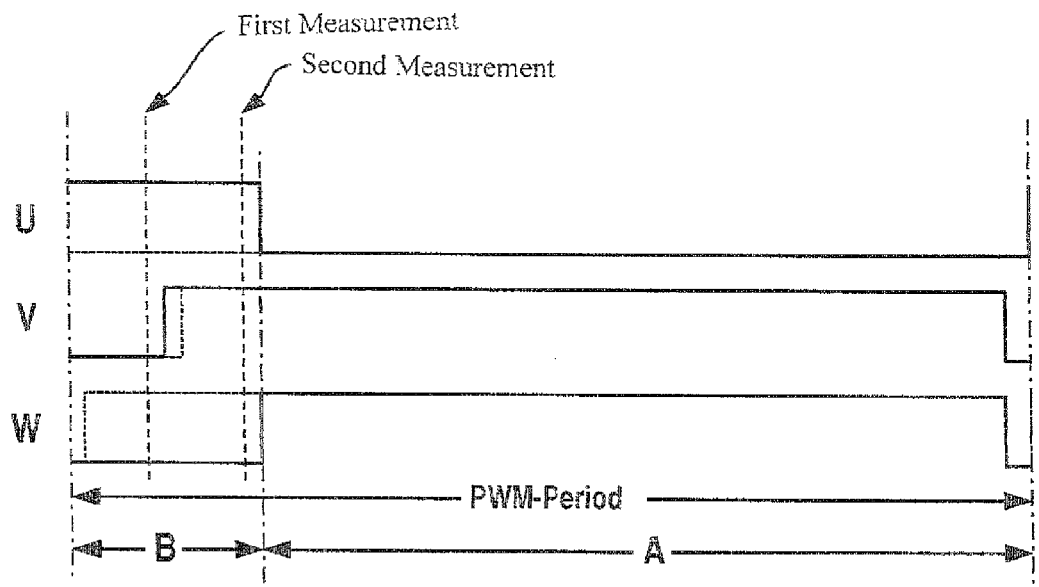
FIG. 7 is a timing diagram showing a shift that corrects the issue shown in FIG. 6.

In FIG. 6, taking the above descriptions into account, it becomes clear that there are an upper and a lower limit of the duty cycle, or in other words that the timing pattern of the trigger signals cannot overshoot the limit, since if it did, the timing pattern for measuring two phase currents in the partial period B would be "destroyed". While in FIG. 5 an asymmetrical pulse width modulation with phase displacement is shown, in which a current measurement is possible, in the example of FIG. 6, the current measurement is no longer possible. If the timing pattern is as in FIG. 5, and the finding in accordance with FIG. 5 is to be employed, then for the pulse width modulation period shown, the timing pattern of FIG. 7 is the result. To better represent the effects of this intentional intervention, the vector diagrams for measurement vectors, set-point vector generation, and vector errors with and without measurement intervention in the following drawings, FIGS. 8 through 11, are referred to.

Figure 8:
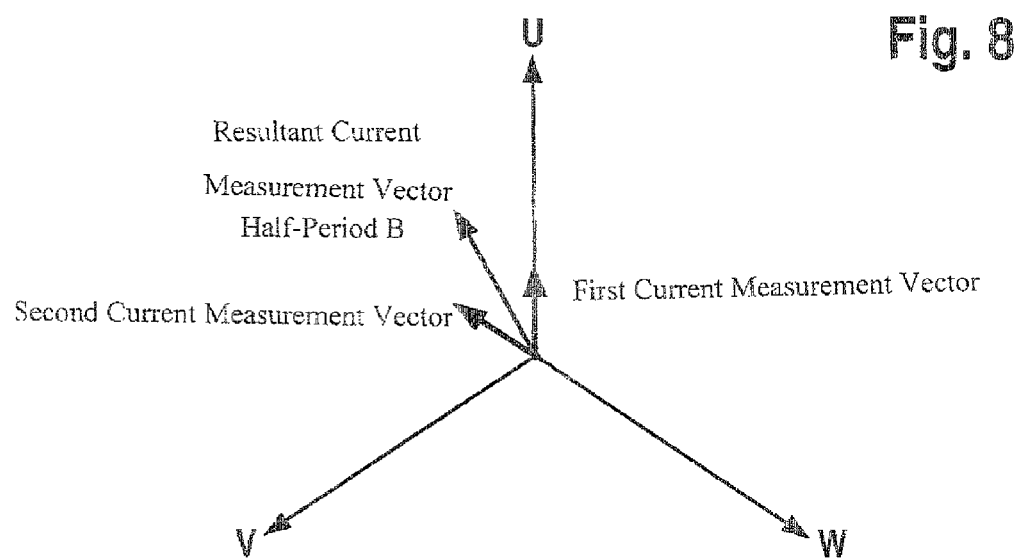
FIG. 8 is a current measurement vector for the first U phase current measurement as shown in FIG. 7.
Figure 9:
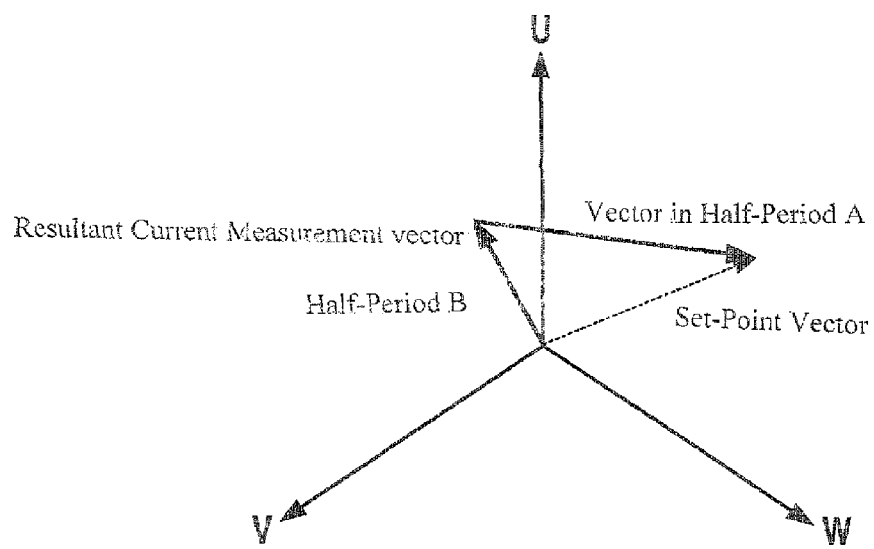
FIG. 9 is a current measurement vector with a set point vector.

In FIG. 8, the result of the first measurement in FIG. 7 is a first current measurement vector, which has the phase relationship of U. The second current measurement vector results from the second measurement, in which components of phases V and W are present. If the two current measurement vectors are vectorially added, they yield a resultant current measurement vector in the partial period B. In FIG. 9, this resultant current measurement vector is shown once again, and in the vector diagram a set-point vector is shown that is predetermined by the control unit as a phase vector, which can be considered as a torque-adjusting and field-forming vector. If now—in accordance with FIG. 9—in the partial period A the "vector in partial period A" shown there is formed, the vectorial addition of the resultant current measurement vector in the partial period B with the vector in the partial period A yields the set-point vector. Hence it is possible to generate a set-point vector, and the current measurement can also be performed.

Figure 10:
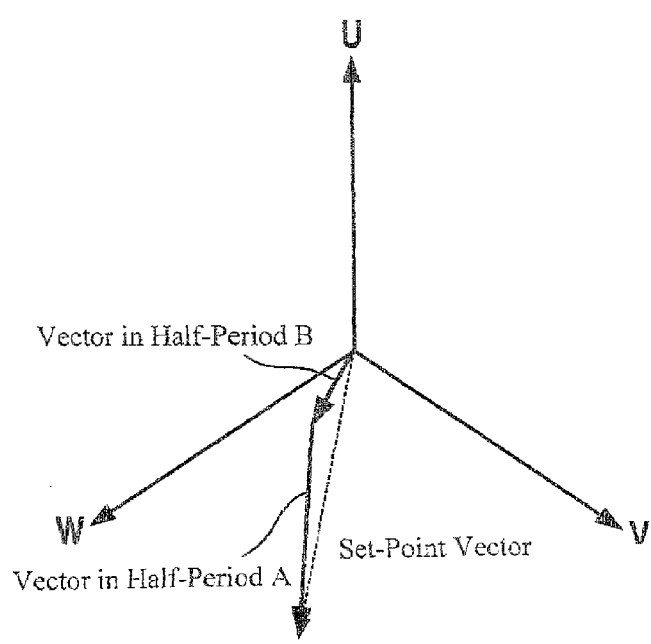
FIG. 10 is a current measurement vector for the timing diagram shown in FIG. 6.

FIG. 10 shows a vector diagram, which corresponds to the graph in FIG. 6, in which a current measurement is not possible since there is no information available about the phase U.

Figure 11:
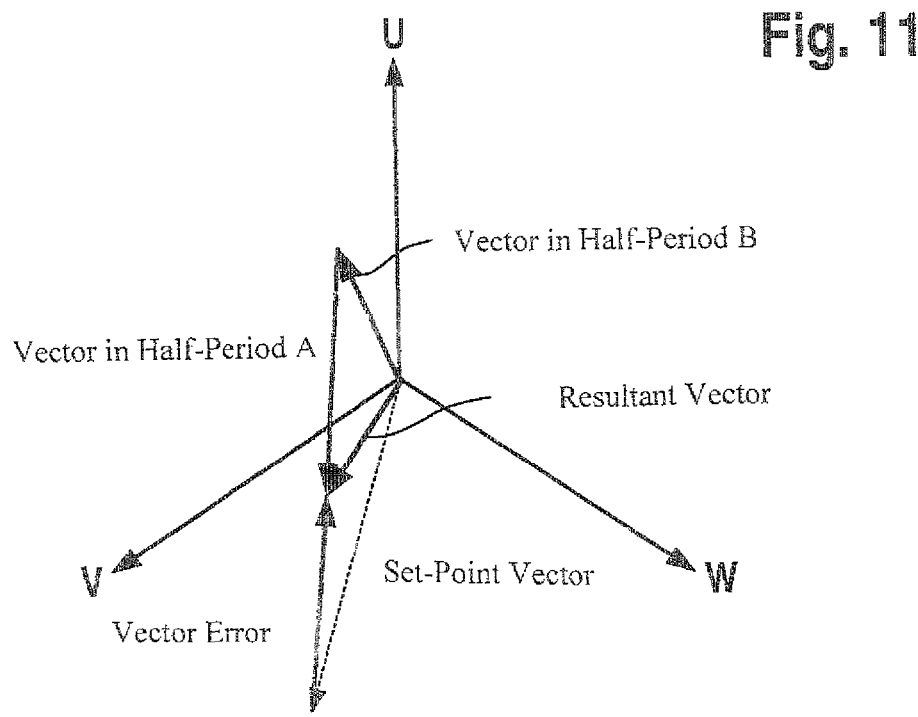
FIG. 11 is a current measurement vector for a current measurement in FIG. 7 with a set point vector and an error vector.

FIG. 11 by means of a vector diagram illustrates the situation in FIG. 7, that is, the asymmetrical pulse width modulation with phase displacement and with intervention for the current measurement. The vector in the partial period B can be seen in the form in which it results from the measurement intervention. The vector in the partial period A is also shown, so that this yields a resultant vector which, however, does not correspond to the set-point vector. Between the resultant vector and the set-point vector is a vector error, which is also shown in FIG. 11. By means of this measurement intervention, a clearly audible noise is generated that has the frequency of the measurement. Moreover, this measurement intervention leads to an increased wattless current component inside the DC link circuit 8 (capacitor). In particular, the measurement intervention leads to an increase in the DC link current. This current increase leads to a greater load on the link current capacitor 9 and the end stage. Moreover, an increase may occur in the torque waviness as a result of the vector error that has occurred. The result of these aforementioned effects is dependent on the amplitude of the measurement intervention vector.

Figure 12:
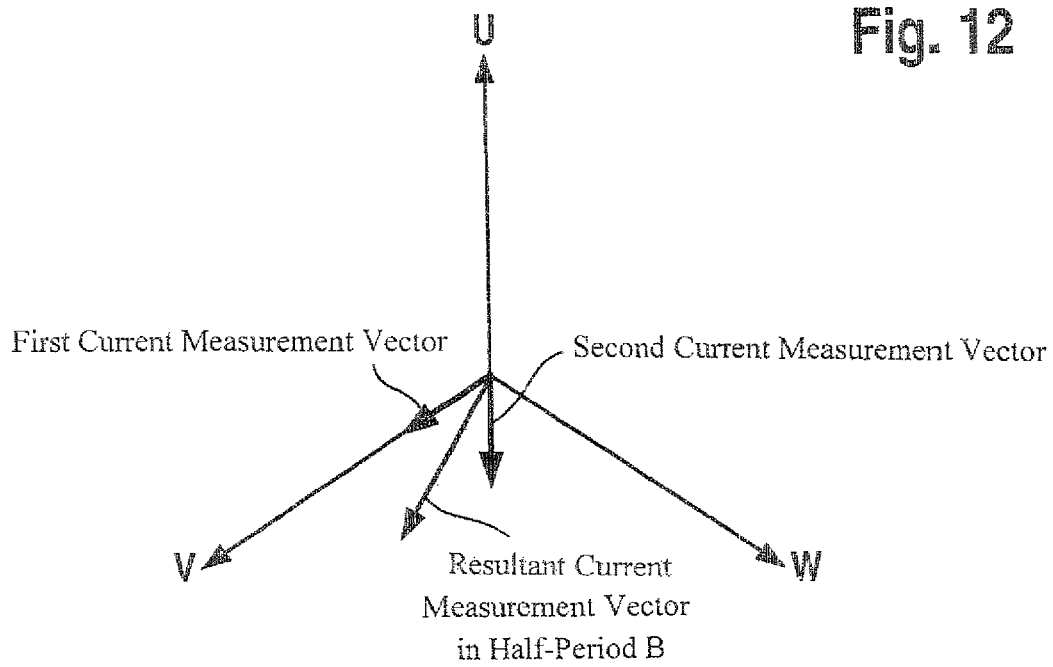
FIG. 12 shows a current measurement vector in the partial period B that is different that the corresponding vector in FIG. 11.
Figure 13:
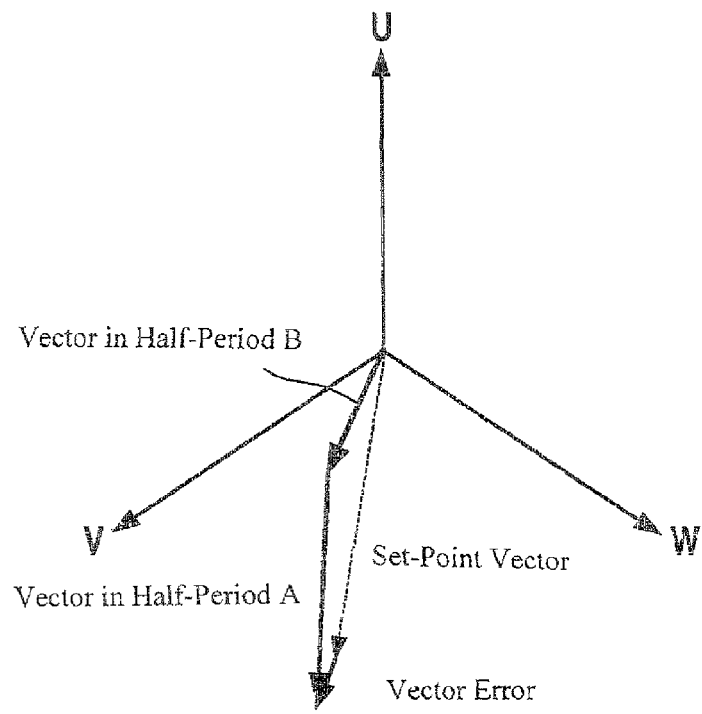
FIG. 13 shows a current measurement vector and a set point vector that reduces the vector error of FIG. 11.

If now—as in FIG. 13—the phase relationship for the two required current measurement vectors is selected according to the invention, then a reduction in the measurement intervention can be brought about, so that the noise production lessens and the capacitor current and the torque waviness in the phase current measurement with only one shunt 10 are reduced. This is clearly shown in FIG. 12, in which the first current measurement vector has the phase relationship V, and the second current measurement vector is composed of the two phase relationships V and W, so that the resultant current measurement vector in the partial period B has the relationship seen in FIG. 12, which deviates from the relationship of the corresponding vector of FIG. 11. If now—in FIG. 13—the set-point vector is entered in the vector diagram corresponding to FIG. 12, as is the vector in the partial period A, then it can be seen that the error vector (vector error) has become much smaller; this is shown by comparing FIGS. 13 and 11.

Figure 14:
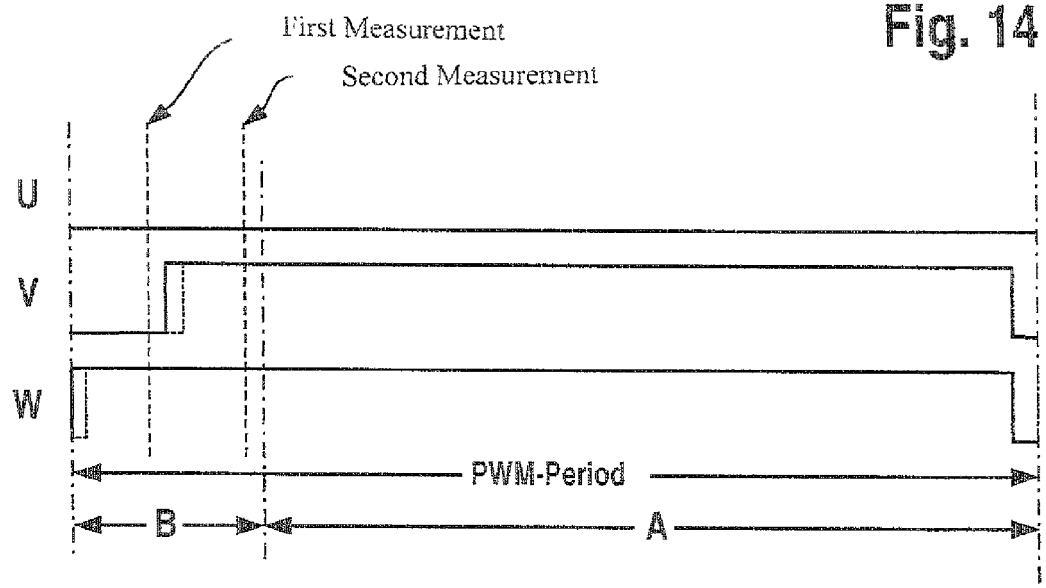
FIG. 14 shows a timing diagram for trigger signals for the vector shown in FIG. 12.
Figure 15:
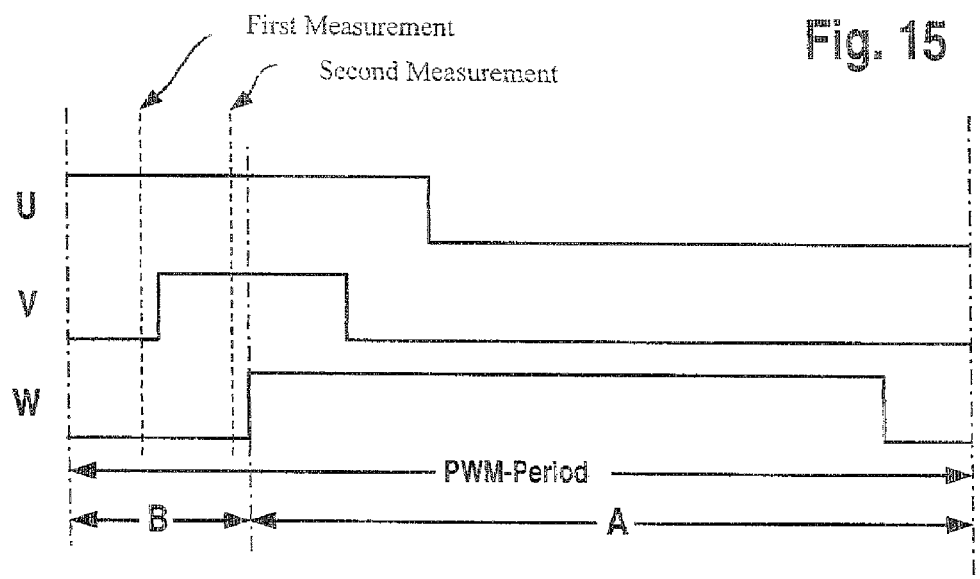
FIG. 15 shows a timing diagram of trigger signals with phase displacement.

The timing pattern corresponding to FIG. 12 and 13 is seen in FIG. 14. It can be seen that using a suitable phase selection in the measurement intervention, the error vector is markedly reduced. For the set-point vector shown, it would go all the way to zero, if a compensation for the measurement intervention were additionally made in the partial period A.

Because of the procedure according to the invention, beginning at a phase displacement of 8 µs and a PWM frequency of 16 kHz as well as a superimposed field-oriented regulation (FOR) at 8 kHz, a current reduction of the link circuit has been effected. The capacitor current has been ascertained over a plurality of different load situations. As the base variant (0%), a purely center-centered triggering was simulated. Thus the following values indicate only a relative factor. By means of a fixed measurement intervention, the critical capacitor current was increased by 26.97%. If the intervention of the measurement is done with phase selection, then only a 20.8% increase in the capacitor current results. The same reduction is attained for the total current as well. The total current represents the effective current in the shunt 10.

Figure 16:
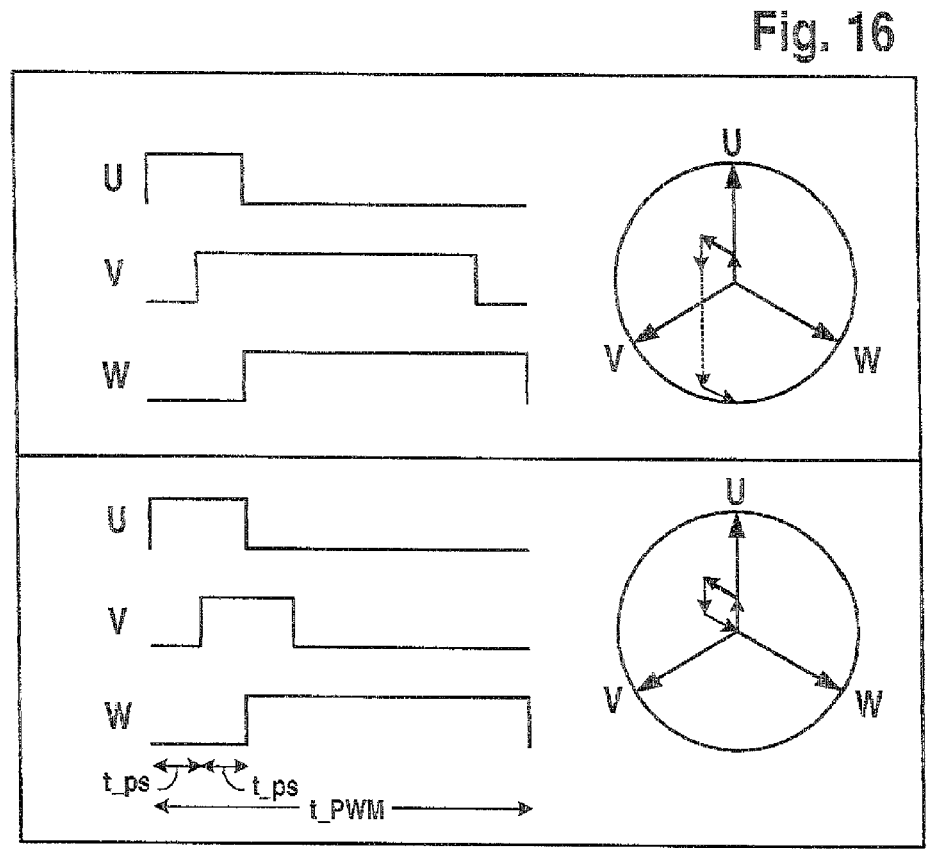
FIG. 16 shows a relationship between trigger signals and current vectors.
Figure 17:
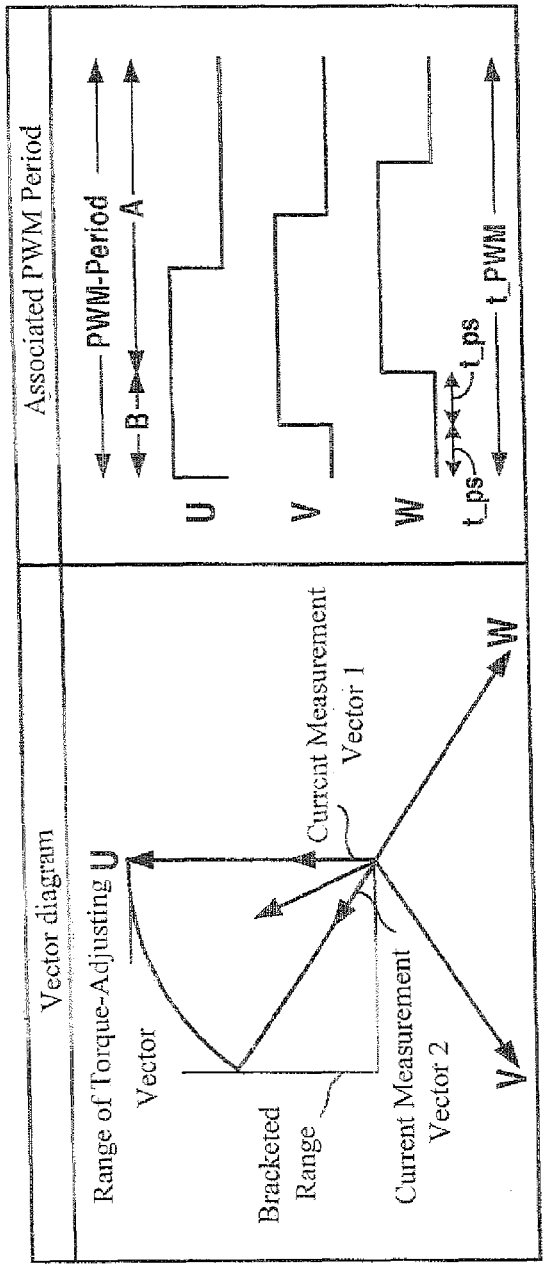
FIG. 17 shows a current vector and a corresponding set of trigger signals for a first phase vector.
Figure 18:
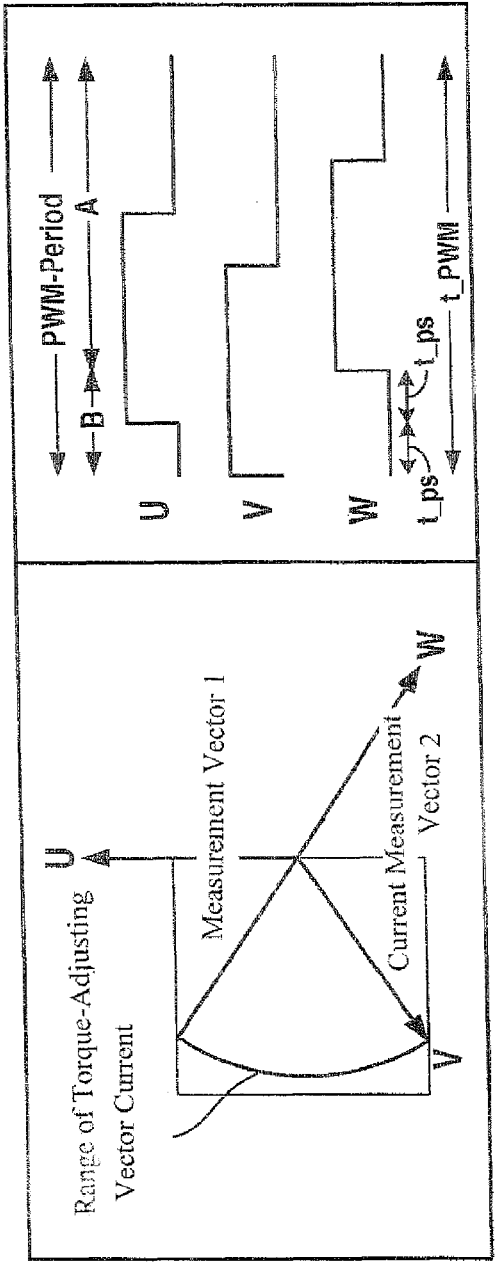
FIG. 18 shows a current vector and a corresponding set of trigger signals for a second phase vector.
Figure 19:
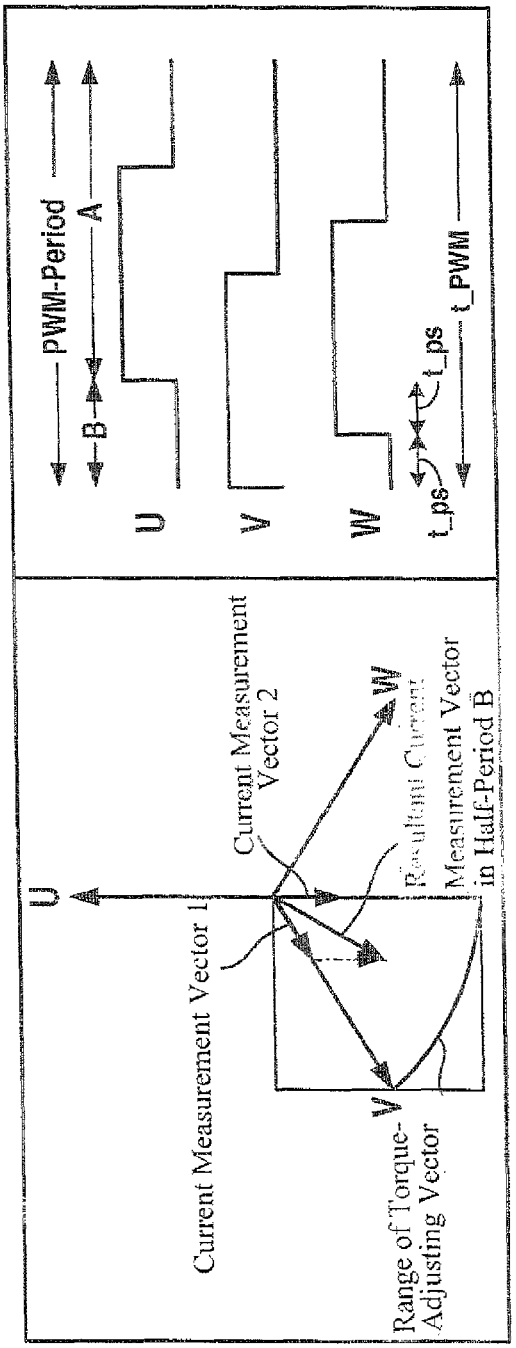
FIG. 19 shows a current vector and corresponding set of trigger signals for a third phase vector.
Figure 20:
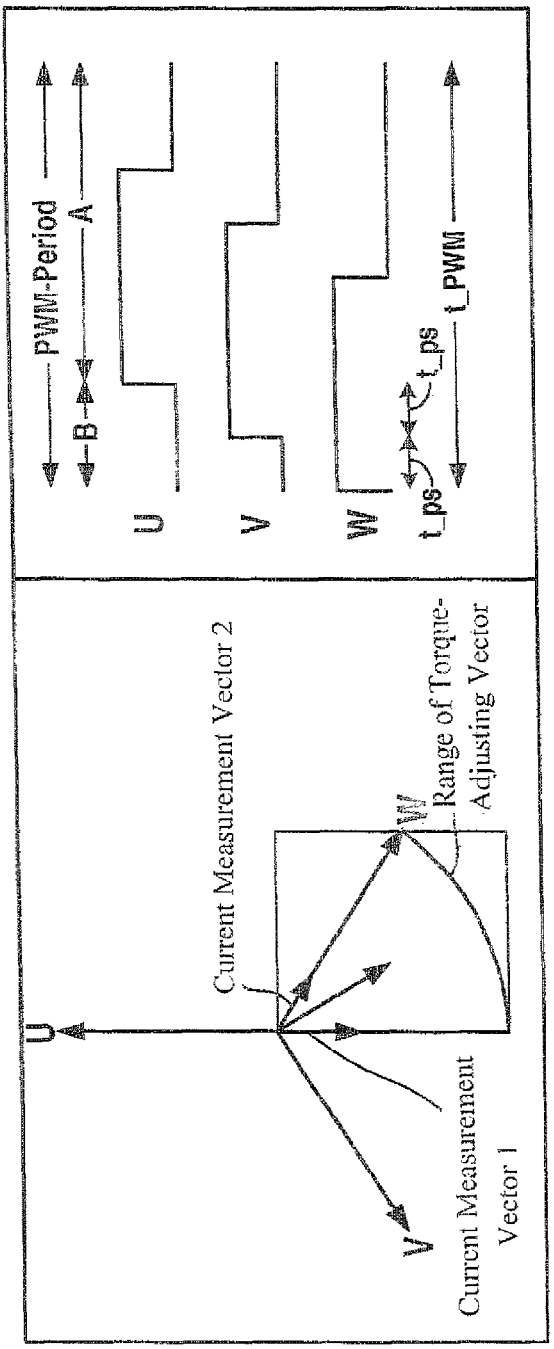
FIG. 20 shows a current vector and a corresponding set of trigger signals for a fourth phase vector.
Figure 21:
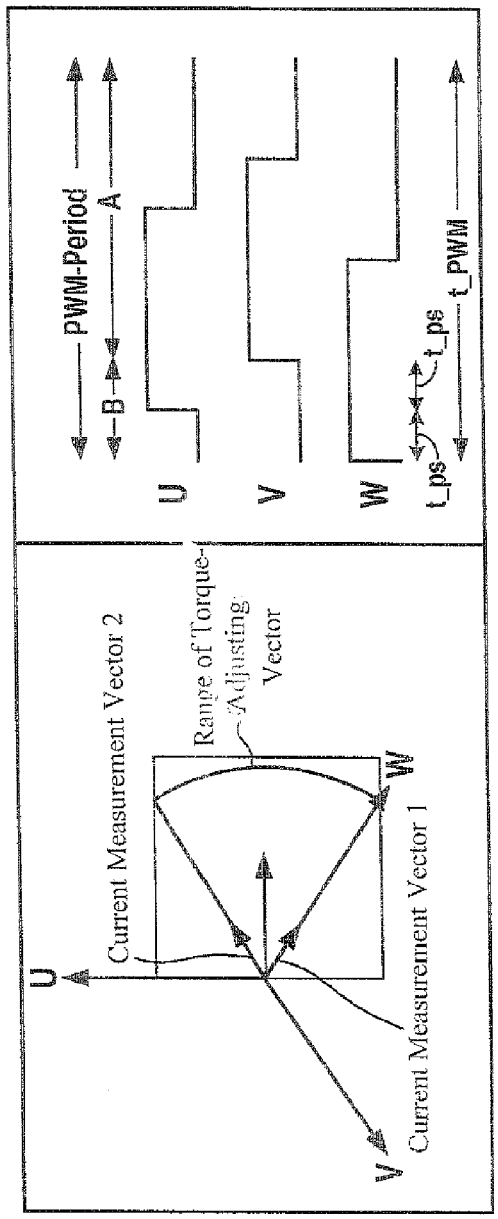
FIG. 21 shows a current vector and a corresponding set of trigger signals for a fifth phase vector.
Figure 22:
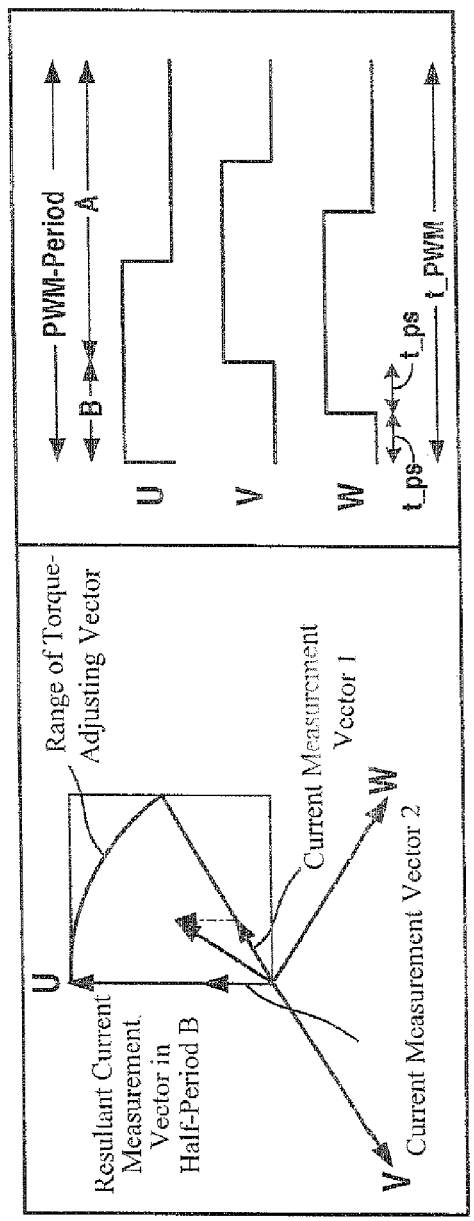
FIG. 22 shows a current vector and a corresponding set of trigger signals for a sixth phase vector.

FIGS. 15 through 22 will now be addressed in greater detail. In the current measurement done there by means of the circuit of FIG. 1, a corresponding timing pattern is used. For noise reasons, this timing pattern is adjusted at every pulse width modulation period (16 Hz), rather than only at each measurement intervention (1 kHz). The timing pattern is effected with phase displacement in the individual phases V and W, as seen from FIG. 15. Once again, a split takes place into one partial period A and one partial period B. The partial period B serves the purpose of current measurement. Once again, a first measurement and a second measurement are performed. However, if a very large vector is necessary for the measurement intervention compensation, then it can happen that the timing pattern is "destroyed" in the current measurement, since the time within the pulse width modulation period no longer suffices to create this vector. An example of this is shown in FIG. 16.

If the torque-adjusting vector is located on the opposite side of the current measurement vector, or in other words if wattless power is generated, then the result is markedly sharper gradients in the creation of the individual switching states, since the difference between the torque-adjusting vector and the current measurement vector (partial period B) is very great.

For this reason, according to the invention the position of the torque-adjusting vector (angle position) relative to the timing pattern (current measurement pattern) to be adjusted is taken into account. The result is now six different current measurement patterns, which are adjusted as a function of the angle position. The reduction of the wattless current component in the link circuit capacitor 9 and in the DC link circuit 8 is advantageous. Moreover, a better utilization of the available voltage range and hence increased effectiveness are attained. A reduction in the gradients in the phase current is effected, and thus a reduction in the so-called torque ripple.

A comparison of FIGS. 17 through 22 shows that a selection of the current measurement pattern as a function of the position of the combination of the torque-adjusting and field-forming vector—hereinafter called the phase vector—can be made. Preferably, for noise reasons, this current measurement pattern is adjusted in every pulse width modulation period, in which the phase vector is within the bracketed range. In FIGS. 18 through 22, a vector diagram is shown on the left and the respective pulse width modulation period on the right in each case. The bracketed range represents the range of the torque-adjusting vector. In FIGS. 17 through 22, in the current measurement patterns that belong to the vector diagram, there is a reference to the vector diagram only in connection with the partial period B. In the partial period A, measurement pattern variation is done as a function of the position inside the bracketed range in the vector diagram.

From FIGS. 17 through 22, it becomes clear that the timing patterns are selected taking into account the instantaneous rotary angle position of the phase vector. In particular, the current measurement vector brought about as a result of the current measurement rotates with the phase vector. As a result, there are current reductions in the link circuit. If the intervention is done entirely as a function of the rotary field angle, then the wattless current is reduced virtually entirely. This reduction also results for the total current that represents the effective current in the shunt 10.

Figure 23:
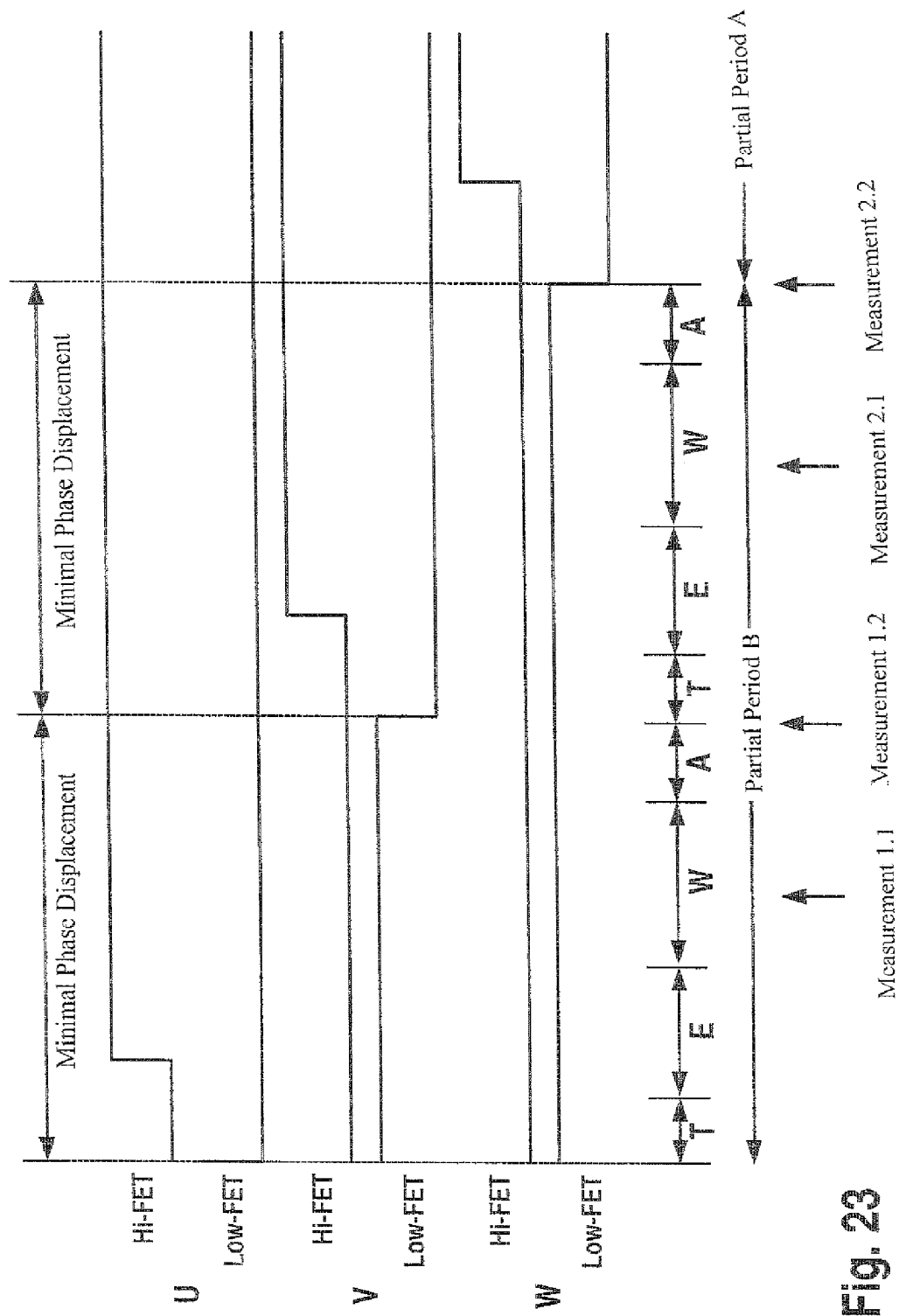
FIG. 23 shows a timing diagram for trigger signals in which multiple current measurements are made during the partial period B.

While in the exemplary embodiment of FIG. 4, a measurement of the current flowing through the shunt is done in two phases in the partial period B, in FIG. 23 it is provided that the two phase currents are sampled multiple times, for instance n times. In FIG. 23, two measurements of the two phase currents per PWM period are shown in graph form. The relationship then applies that the minimal phase displacement results in accordance with the following equation:

Minimal phase displacement=minimal idle time T of the circuit element, in particular minimal dead time T of a bridge branch+minimal settling time B of the measuring amplifier circuit+minimal conversion time W·(n−1)+minimal sampling time A of the analog/digital converter; n represents the number of measurements of a phase current per PWM period. The term "conversion time W of the analog/digital converter" is understood to mean one complete conversion time, which is composed of a sampling time of a sample-and-hold element and a conversion time of the analog/digital converter. It can be seen from FIG. 23 that in the partial period B with respect to the current measurement of a first phase, the measurements 1.1 and 1.2 are performed. Thus two current measurements of one phase in this period are available. In the ensuing period of time, within the partial period B of this period, the measurements 2.1 and 2.2 are then effected, that is, two current measurements of a different phase. The respective current in the third phase is then determined in accordance with Kirchhoff's laws.

The foregoing relates to the preferred exemplary embodiments of the invention, it being understood that other variants and embodiments thereof are possible within the spirit and scope of the invention, the latter being defined by the appended claims.

The invention claimed is:

1. A method for measuring currents in a multiphase electrical network comprising:
    generating trigger signals with a predetermined timing pattern to operate at least one controllable circuit element to selectively couple a multiphase electric motor to a DC power source; and
    chronologically shifting at least one of the generated trigger signals to produce measurement windows that enable measurement of a first current and a second current through a single shunt resistor, the first current corresponding to a first phase current through the multiphase electric motor and the second current corresponding to a second phase current through the multiphase electric motor, the chronological shifting for the at least one generated trigger signal corresponding to a dead time of the at least one controllable circuit element that corresponds to a sum of a dead time of a bridge branch through the multiphase electric motor, a settling time of an amplifier circuit used to measure the first and second currents, and a sampling time of an analog/digital converter that converts an output signal of the amplifier circuit to a digital value.

2. The method for current measurement as defined by claim 1, further comprising:
    selecting the at least one generated trigger signal with reference to a phase current to be measured.

3. The method for current measurement as defined by claim 1 further comprising:
    selecting the at least one generated trigger signal with reference to an instantaneous rotary angle position of a phase vector.

4. The method for current measurement as defined by claim 1, wherein an analog/digital converter conversion time is added to the sum.

5. The method for current measurement as defined by claim 1, the generation of the trigger signals further comprising:
    generating pulse width modulation signals to operate a plurality of field effect transistors to control application of a DC voltage to the multiphase electric motor.

6. The method for current measurement as defined by claim 1, the measurement of the first current and the second current further comprising:
    measuring the first current and the second current through the single shunt resistor with the amplifier circuit at different times.

7. The method for current measurement as defined by claim 2 wherein the selection of the at least one trigger signal is made with reference to a deviation of one of the measured currents from a predetermined set-point vector.

* * * * *